United States Patent [19]
Kamei

[11] Patent Number: 5,201,161
[45] Date of Patent: Apr. 13, 1993

[54] NUCLEAR POWER PLANT CONSTRUCTION METHOD

[75] Inventor: Hideaki Kamei, Abiko, Japan

[73] Assignee: Kabushiki Kaisha Toshiba, Kawasaki, Japan

[21] Appl. No.: 725,613

[22] Filed: Jul. 3, 1991

[30] Foreign Application Priority Data

Jul. 4, 1990 [JP] Japan ................................ 2-175393

[51] Int. Cl.⁵ .............................................. E04B 1/04
[52] U.S. Cl. .............................. 52/745.02; 52/745.13
[58] Field of Search .................. 376/295, 296; 52/224, 52/245, 249, 741, 745

[56] References Cited
U.S. PATENT DOCUMENTS 3,369,334 2/1968 Berg ........................................ 52/227
3,713,968 1/1973 Kennedy et al. ....................... 52/224

Primary Examiner—James L. Ridgill, Jr.
Attorney, Agent, or Firm—Oblon, Spivak, McClelland, Maier & Neustadt

[57] ABSTRACT

In a nuclear power plant construction, a reinforced concrete containment vessel is installed on a foundation base mat and a reactor building is then installed around the reinforced concrete containment. The reactor building is provided with a plurality of concrete bodies, as floor slabs, projecting inwardly from an inner wall surface of the reactor building with spaces between the projected ends of the concrete bodies and an outer surface of the reinforced concrete containment vessel in vertically different levels in the reactor building. A precast concrete slab is arranged in each of the spaces between the concrete body of the reactor building and the outer surface of the reinforced concrete containment vessel with spaces therebetween. The precast concrete slab and the projected end of the concrete body of the reactor building and the precast concrete slab and the reinforced concrete containment vessel are joined with the joint assemblies. The joint assembly is a screw joint member or brackets or the combination thereof. The precast concrete slabs are joined to the projected concrete bodies of the reactor building and the reinforced concrete containment vessel successively from a lower level to an upper level of the location of the projected concrete bodies.

7 Claims, 3 Drawing Sheets

NUCLEAR POWER PLANT CONSTRUCTION METHOD

BACKGROUND OF THE INVENTION

The present invention relates to a nuclear power plant construction method, and more particularly to a method of joining a reactor building (RB) to a reinforced concrete containment vessel (RCCV) as a contiguous portion therebetween.

In a general method of constructing a reactor building, an RCCV having a cylindrical outer wall is installed immediately after forming a concrete foundation base mat of the reactor building. The reason why the cylindrical wall is completed preferentially is that the construction of the RCCV constitutes critical pathes in the whole constructing working of the reactor building.

Other constructing workings are successively done, after the construction of the cylindrical wall of the RCCV, by mainly casting each floor slab, an RB outer side wall, a supporting pedestal of a reactor pressure vessel, an RCCV top slab, an RB slab and an RB roof truss in this order.

Then, the joining of the reactor building to the RCCV as contiguous portion work therebetween is carried out by casting concretes in spaces between the slabs, i.e. RB slabs and the floor slabs, of the reactor building and the outer surface of the cylindrical wall of the RCCV.

Now, before the casting, reinforcing members are embedded in one ends into the concrete bodies of the RB slabs and the wall of the RCCV so as to extend outward therefrom at the other ends. Thereafter, some other reinforcing members as re-bars are placed between the aforementioned reinforcing members and casting frames are then set as curing concrete.

It is however complicated to make the reinforcing members jut out from the concrete body, to temporarily set scaffoldings for this working, to place the other reinforcing members and to set the temporary frames for every floor in the reactor building. In addition, the casting and seting workings of the concrete also make complicated the whole construction workings as well as the disassembling of the scaffoldings and the temporary frame. These complicated workings make delay the completion of the construction of the final reactor building and compel workers to work hard in the working places.

In the working places, many equipments and machineries for the nuclear power plant are arranged on the respective floors, i.e. RB slabs, of a reactor building, and these equipments and machineries are, in the actual arrangement, carried in the reactor building by hanging them by a crane, for example, from the upper side of the reactor building and set to the predetermined positions on the respective floors. However, because the floor portions of the joining portions between the reactor building and the RCCV are constructed after the installation of the reactor building and the respective floors and, moreover, the reinforcing members project from the RB slabs and the wall portions of the RCCV, the equipments and machineries to be arranged to these floor portions of the joining portions (contiguous portion) must be carried in the reactor building through openings formed temporarily to the side wall of the reactor building after the construction of the reactor building. These openings also must be closed after the conveyance of these equipments and machineries As described above, in the conventional method of constructing a reactor building, it is necessary to provide the reinforcing members having ends embedded in the RB slabs and the outer wall of the RCCV for the joining portions therebetween, thus being complicated in the actual construction working and troublesome. Moreover, in case of the construction of the joining portions, many additional workings such as assembling and disassembling the working scaffoldings, forming the casting frames and so on, resulting in the elongation of the total working times as well as the increasing of the working steps.

In addition, the conveyance of the equipments and machineries through the openings formed to the side walls of the reactor building after the construction thereof also makes complicated the construction working, which may cause a problem of safety working as well as the elongation of the construction term.

SUMMARY OF THE INVENTION

An object of the present invention is to substantially eliminate defects or drawbacks encountered in the prior art described above and to provide a reactor building construction method capable of shortening the construction term of the reactor building and reducing the construction cost.

Another object of the present invention is to provide a reactor building construction provided with an improved joining portions as contiguous portions between the reactor building slabs and the outer wall of the reinforced concrete containment vessel disposed in the building.

These and other objects can be achieved according to the present invention, in one aspect, by providing a method of constructing a nuclear power plant comprising the steps of constructing foundation base mat, installing a reinforced concrete containment vessel on the base mat, installing a reactor building around the reinforced concrete containment, the reactor building being provided with a plurality of concrete bodies, as floor slabs, projecting inwardly from an inner wall surface of the reactor building with spaces between the projected ends of the concrete bodies and an outer surface of the reinforced concrete containment vessel in vertically different levels in the reactor building, arranging a precast concrete slab in each of the spaces between the concrete body of the reactor building and the outer surface of the reinforced concrete containment vessel with spaces therebetween, forming a joint assembly between each of spaces between the precast concrete slab and the projected end of the concrete body of the reactor building and between the precast concrete slab and the reinforced concrete containment vessel, and joining, with the joint assemblies, the precast concrete slab and the projected end of the concrete body of the reactor building and joining, with the joint assemblies, the precast concrete slab and the reinforced concrete containment vessel.

In a preferred embodiments, the joint assembly is a screw joint member, which comprises at least one pair of screw pins having one ends fixed to the precast concrete slab and the projected end of the concrete body of the reactor building or the outer surface of the reinforced concrete containment vessel and having other ends facing each other and a coupling grappling the other ends of the respective screw pins in screw engagement. The joint assembly may be a pair of brackets secured to the projected end of the concrete body of the reactor building and the outer surface of the reinforced concrete containment vessel, the brackets being disposed at the same level in the space therebetween so as to mount the precast concrete slab on the brackets. The joint assembly may be a combination of a screw joint member and a bracket.

The precast concrete slabs are joined to the projected concrete bodies of the reactor building and the reinforced concrete containment vessel successively from a lower level to an upper level of the location of the projected concrete bodies.

According to the method of constructing a nuclear power plant of the characters described above, the precast concrete slab is arranged in the spaces between the reactor building slabs projected inward from the inner wall thereof and the outer surface of the reinforced concrete containment vessel. The precast concrete slabs are joined with the reactor building slabs and the reinforced concrete containment vessel through the joining assemblies of the specific structure. Accordingly, the frame construction and the arrangement of the reinforcing members for reinforcing the joining portion between the reactor building and the concrete containment vessel can be made simple, resulting in the reduction of the troublesome working in the working place.

The usage of the precast concrete slabs and the joining assemblies makes it possible to effectively utilize the spaces between the reactor building slabs and the reinforced concrete containment vessel before the joining, so that the equipments and machineries for the reactor building can be carried therein through these spaces. This advantage can be enhanced by constructing the joining portion from the lower stages or floors of the slabs in the reactor building.

BRIEF DESCRIPTION OF THE DRAWINGS

For a better understanding of the present invention and to show how the same is carried out, reference is made, by way of preferred embodiments, to the accompanying drawings, in which.

DESCRIPTION OF THE PREFERRED EMBODIMENTS

Figure 1:
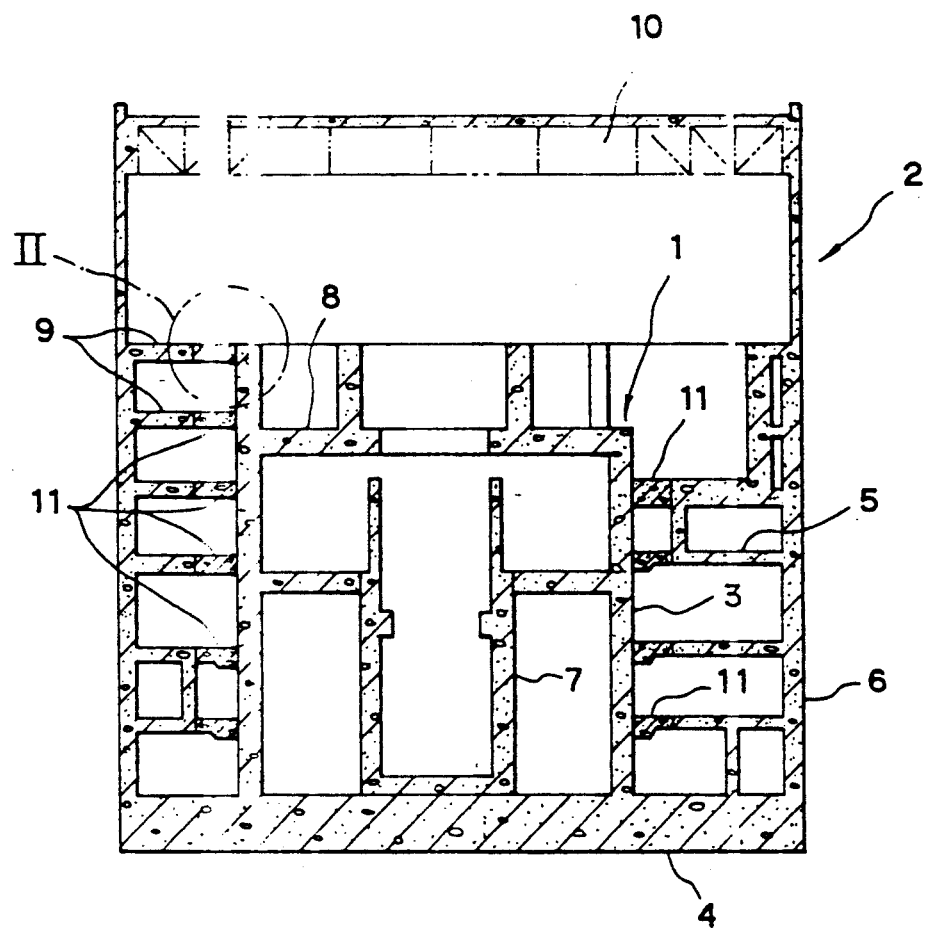
FIG. 1 is an elevational section of a reactor building provided with joining portions as contiguous portions between the reactor building and the reactor concrete containment vessel according to the present invention.

Referring to FIG. 1, reference numeral 2 denotes a reactor building (RB) which is installed on a foundation base mat 4. In the RB 2, is disposed a reinforced concrete containment vessel (RCCV) 1 having substantially outer cylindrical wall 3. A plurality of floors are formed between the RB 2 and the RCCV 1 at different levels and various equipments and machineries for a nuclear power plant are arranged on the respective floors. The floors are generally formed with RB slabs 9 made as concrete bodies. The RB 2 and the RCCV 1 are interconnected through joining portions as contiguous portions, encircled as II for example shown in FIG. 1, which are formed with precast concrete slabs 11. According to the present invention, the precast concrete slabs 11, the RB slabs 9 and the cylindrical wall 3 of the RCCV 1 are mutually connected through joining members, described hereinlater, disposed in spaces 12, in FIG. 2. On the righthand side, as viewed, floor slabs 5 made as concrete bodies and the RCCV 1 are also joined through the joining portions substantially the same manner as described above. The outer wall 6 of the RB 2, the respective slabs and the cylindrical wall 3 of the RCCV 1 are all generally made of concrete material.

In the actual construction of the RB 2, a foundation base mat 4 is first formed on a site of a nuclear power plant. A cylindrical wall 3 constituting a reinforced concrete containment vessel (RCCV) 2 is then installed on the base mat 4 immediately after the construction of the base mat 4.

After the completion of the cylindrical wall 3 of the RCCV 1, other construction workings are successively gone on, such as casting each floor slabs 5, constructing an RB outer wall 6 and a reactor pressure vessel supporting pedestal 7 of a reactor pressure vessel and casting an RCCV top slab 8, an RB slab 9 and an RB roof truss 10.

After the basic construction of the reactor building as described above, it is then carried out to join the RB 2 to the RCCV 1, and more particularly, to join the respective slabs 9 and 5 of the RB 2 to the outer surface of the cylindrical wall 3 of the RCCV 1 by interposing the precast concrete slabs 11 therebetween.

Figure 2:
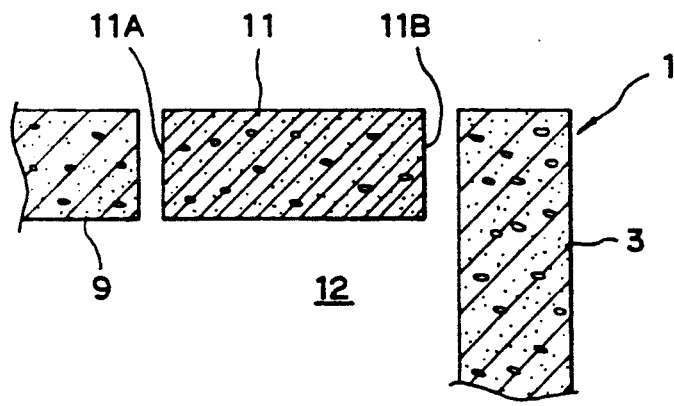
FIG. 2 is a magnified fragmental sectional view of the joining portion before the formation thereof encircled by II in FIG. 1.

Each of the precast concrete slabs 11 is arranged in spaces 12 between the slab 5 and the outer surface of the cylindrical wall 3 as shown in FIG. 2. The precast concrete slab 11 is joined at its one end 11A to the concrete slab 9 (or 5) of the RB 2 and also joined to the concrete body of the wall 3 of the RCCV 1 at its the other end 11B by using interconnecting joint members or assembly.

Figure 3:
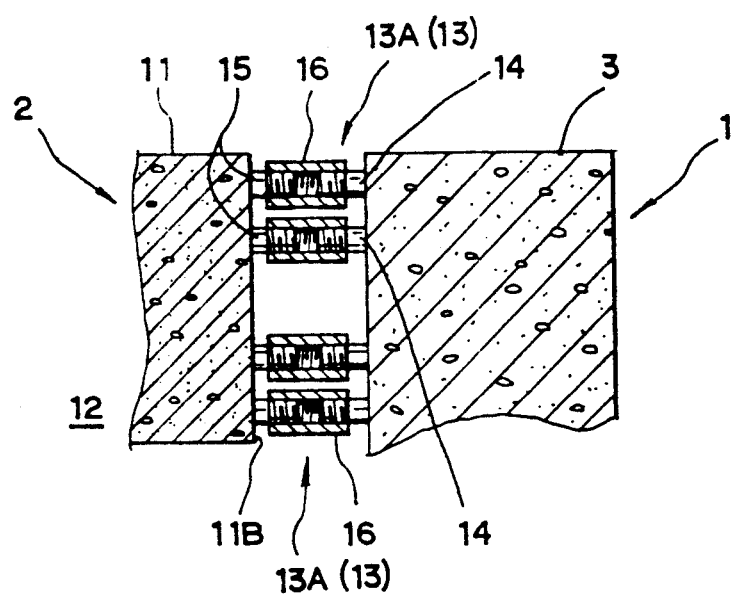
FIG. 3 is also a magnified fragmental sectional view of the portion shown in FIG. 2 after the formation thereof according to one embodiment of the present invention.

FIG. 3 shows one example of the usage of the joint member 13, in which the joint member is composed of a screw joint member 13A comprising a pair of screw pins 14 and 15 and a screw coupling 16 which grapples with them in screw engagement. The pin 14 is fixed to the wall 3 of the RCCV 1 at its one end and the pin 15 is fixed at its one end to the end 11B of the precast concrete slab 11, the free ends of these pins 14 and 15 facing each other. At least one screw joint member 13A is located between the wall 3 and the precast concrete slab 11 and four screw joint members 13A are located in the illustrated embodiment. Such screw joint member 13A is located between the other end 11A of the slab 11 and the RB slab 9. These precast concrete slabs and the joining members are also located between the slab 5 and the wall 3 of the RCCV 1. Then, turning the screw couplings 16 on the screw pins 14 and 15, the precast concrete slabs 11 are clamped in the spaces 12, thus achieving the firm joining between the RB slabs 9, the wall 3 of the RCCV 1 and the slabs 5, i.e. between the RB 2 and the RCCV 1.

Figure 4:
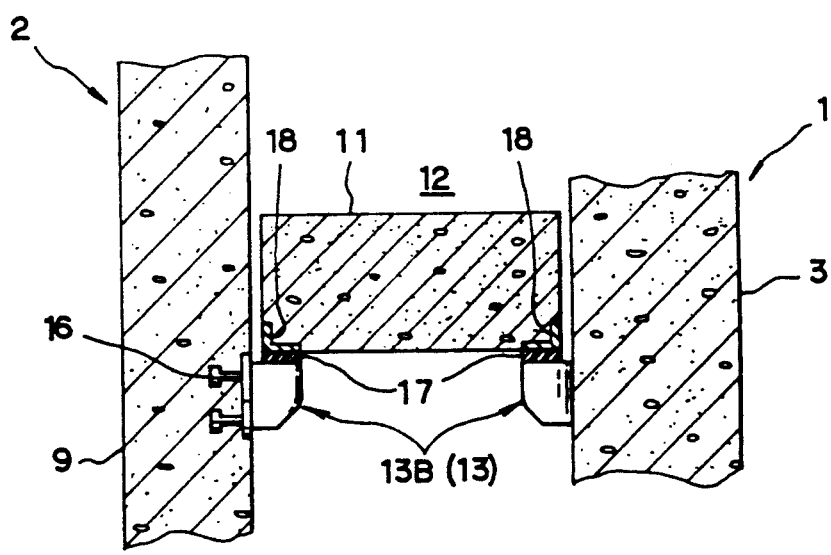
FIGS. 4 and 5 are also magnified fragmental sectional views of the joining portion according to another embodiments of the present invention.

In another embodiment of the joining member shown in FIG. 4, brackets 13B are used, which are fixed to the cylindrical wall 3 of the RCCV 1 and the RB slab 9 by, for example, embedding leg portions 19 of the brackets 13B thereinto. These pair of brackets 13B are disposed on the same level in the space 12. The precast concrete slab 11 is placed on the brackets 13B and then fixed thereto such as by means of welding. In the welding operation, it may be preferred to preliminarily disposing corner angles 18 at portions to be welded of the precast concrete slab 11.

Figure 5:
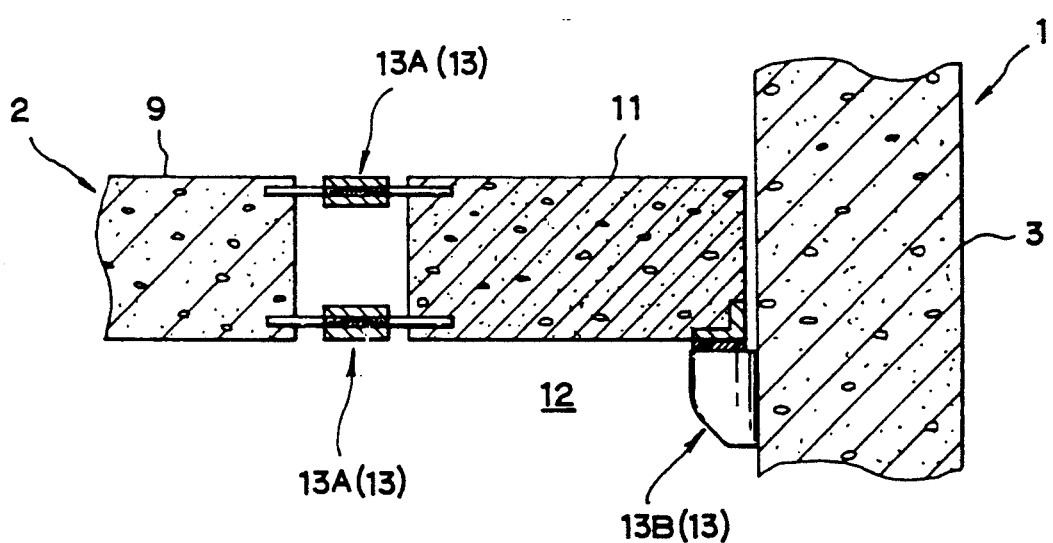

FIG. 5 shows a further embodiment of the joint member 13, in which the screw joint member 13A of the character described with reference to FIG. 3 is used for joining the one end 11A of the precast concrete slab 11 to the RB slab 9 and the bracket 13B of FIG. 4 is used for joining the other end 11B of the slab 11 to the wall 3 of the RCCV 1.

The aforementioned joining members or assemblies are disposed at plural portions around the circumferential surface of the outer wall of the reinforced concrete containment vessel.

In any one of the above embodiments, after the joining members or assemblies are located and secured to the precast concrete slabs, the spaces of the joining portions are filled up with concrete material so as to form continuous floor slab portions between the reactor building and the reinforced concrete containment vessel wall.

It is to be noted that the combined use of the joining members of FIGS. 3, 4 and 5 may be possible for joining the RB and the RCCV in accordance with portions of the slabs 5, 9, 11 and the cylindrical wall 3 to be joined.

A grouting joint or other mechanical joint member may be used instead of the joint members described above.

It is also to be understood that the present invention is not limited to the described preferred embodiments and other changes or modifications may be made within the scope of the appended claims.

What is claimed is:

1. A method of constructing a nuclear power plant, comprising the steps of:
    constructing foundation base mat;
    installing a reinforced concrete containment vessel on the base mat;
    installing a reactor building around the reinforced concrete containment vessel, said reactor building being provided with a plurality of concrete bodies projecting inwardly from an inner wall surface of the reactor building with spaces between the projected ends of the concrete bodies and an outer surface of the reinforced concrete containment vessel to thereby form staged floors in vertically different levels in the reactor building;
    arranging a precast concrete slab in each of the spaces between the concrete body of the reactor building and the outer surface of the reinforced concrete containment vessel with spaces therebetween;
    forming joint means between each of spaces between the precast concrete slab and the projected end of the concrete body of the reactor building and between the precast concrete slab and the reinforced concrete containment vessel; and
    joining, with the joint means, the precast concrete slab and the projected end of the concrete body of the reactor building and joining, with the joint means, the precast concrete slab and the reinforced concrete containment vessel.

2. The method according to claim 1, wherein said joint means comprises a combination of a screw joint member and a bracket.

3. The method according to claim 1, wherein the precast concrete slabs are joined to the projected concrete bodies of the reactor building and the reinforced concrete containment vessel successively from a lower level to an upper level of the location of the projected concrete bodies.

4. The method according to claim 1, wherein said joint means is screw joint member.

5. The method according to claim 4, wherein said screw joint member comprises at least one pair of screw pins having one ends fixed to the precast concrete slab and the projected end of the concrete body of the reactor building or the outer surface of the reinforced concrete containment vessel and having other ends facing each other and a coupling grappling the other ends of the respective screw pins in screw engagement.

6. The method according to claim 1, wherein said joint means is a pair of brackets secured to the projected end of the concrete body of the reactor building and the outer surface of the reinforced concrete containment vessel, said brackets being disposed at the same level in the space therebetween so as to mount the precast concrete slab on the brackets.

7. The method according to claim 6, wherein said precast concrete slab is welded to the brackets.

* * * * *